United States Patent [19]

Perks

[11] Patent Number: 4,908,973

[45] Date of Patent: Mar. 20, 1990

[54] FISHING ROD HOLDER

[76] Inventor: James Perks, 2440 Bromsgrove Road, Unit 73, Mississauga, Ontario, Canada, L5L 4J7

[21] Appl. No.: 228,480

[22] Filed: Aug. 5, 1988

[51] Int. Cl.⁴ ............................................. A01K 87/02
[52] U.S. Cl. ........................................... 43/17; 43/15; 43/16
[58] Field of Search .............................. 43/15, 16, 17

[56] References Cited

U.S. PATENT DOCUMENTS

| | | | |
|---|---|---|---|
| 2,714,270 | 8/1955 | Premo | 43/17 |
| 3,143,822 | 8/1964 | Schooley | 43/17 |
| 4,633,608 | 1/1987 | Savarino | 43/17 |
| 4,746,253 | 5/1988 | Simmons | 43/17 |

*Primary Examiner*—Nicholas P. Godici
*Assistant Examiner*—Michael W. Starkweather
*Attorney, Agent, or Firm*—Eugene J. A. Gierczak

[57] ABSTRACT

A fishing rod holder adapted to generate a signal in response to a pull on the line of a fishing rod. Including a structure for supporting the fishing rod; an arm which is substantially Z-shaped, one end of the arm is attached to a pivot located at one end of the support and the other arm end is hookably engageable with the line of the fishing rod whereby an outward pull from the line will initiate a pivotable displacable from to an off position and on position. Further including, signal device for generating a signal when the arm is in the on position; a switch associated with the arm and signal for activating said signal to generate a signal when said arm is in the on position in response to a pull on the line of the fishing rod, and for deactivating same signal when the arm is in the off position.

9 Claims, 4 Drawing Sheets

4,908,973

FISHING ROD HOLDER

FIELD OF INVENTION

This invention relates to a fishing rod holder that generates a signal in response to a pull on the line of the fishing rod by a fish or the like and in particular relates to a fishing rod holder including a pivotable arm engageable with the line of a fishing rod for pivotable movement between an off position and an on position when a fish pulls on the line so a to generate a signal.

BACKGROUND TO THE INVENTION

Various devices are well known to those persons skilled in the art for holding fishing rods and for generating signals to indicate a bite or strike on a fish hook bearing line.

For example, U.S. Pat. No. 4,236,339 discloses a signal fishing stand which has a pointed support which can be made to engage in the ground or with folded legs to hold up the stand and may also provide a tackle box for holding a fisherman's gear.

Furthermore, U.S. Pat. No. 2,530,864 relates to an ice fishing apparatus which has signal structure which is automatically elevated when a fish is caught.

Moreover, U.S. Pat. No. 2,801,488 utilizes springs to hold the handle of a fishing rod.

Yet another patent which discloses an electric fishing signal device comprising of a buzzer and light is disclosed in U.S. Pat. No. 2,814,900.

Finally, U.S. Pat. No. 4,519,158 teaches apparatus for indicating activation of a fishing line which includes a switching mechanism that activates a light indicator when a force is applied to the fishing line.

Such prior art devices present relatively complicated devices having relative utility.

It is an object of this invention to provide an improved fishing rod holder which also generates a signal in response to a pull on the line of a fishing rod.

The broadest aspect of this invention relates to a fishing rod holder adapted to generate a signal in response to a pull on the line of a fishing rod, including: structure for supporting said fishing rod; an arm which is substantially Z-shaped, one end of the arm is attached to a pivot located at one end of said support and the other arm end is lookably engageable with said line of said fishing rod whereby an upward pull from the line will initate for pivotable displacement from an off position to an on position; structure for generating a signal when said arm is in said on position; and a switch associated with said arm and said signal structure for activating said signal to generate a signal when said arm is in said on position in response to a pull on said line of said fishing rod, and for deactivating said signal when said arm is in said off position.

Yet another aspect of this invention relates to a fishing rod holder adapted to generate a signal in response to a pull on the line of a fishing rod including: a vertical stand; an elongated body integrally connected to said stand and inclined at an acute angle from the horizontal so as to present one inclined end of said body and one declined end of said body; a post projecting vertically upwardly from said body and terminating with a V-shaped notch adapted to hold said rod, said post including a channel for slideably receiving said line; a clamping post extending vertically upwardly from said body for clamping the handle of said fishing rod, said clamping post slideably positionable along said body for adjustment relative said vertical post; an arm which is substantially Z-shaped, one end of the arm is attached to a pivot located at said inclined end of said body and the other arm end is hookably engageable with said line of said fishing rod whereby an upward pull from the line will initiate for pivotable displacable from an off position and an on position; signal device disposed interiorally of said body at said declined end for generating a signal when said arm is in said on position; a switch device disposed interiorally of said body at said inclined end and connected to said arm and said signal device for activating said signal to generate a signal when said arm is in said on position in response to a pull on said line of said fishing rod, and for deactivating said signal when said arm is in said off position.

A fishing rod holder adapted to generate a signal in response to a pull on the line of a fishing rod, including: a structure for supporting said fishing rod; arm one end of the arm is attached to a pivot located at one end of said support means, and the other end is hookably engageable with said line of said fishing rod, whereby an upward pull from the line will initiate a pivotable displacement from an off position to an on position; including selectable weight means carried by said arm for selectably increasing the resistance to the pivotable movement of said arm between said off position and said on position in response to a pull on said line of said fishing rod; structure for generating a signal for generating a signal when said arm is in said on position; a switch associated with said arm and structure for generating a signal for activating said structure for generating a signal to generate a signal when said arm is in said on position in response to a pull on said line of said fishing rod and for deactivating said structure for generating a signal when said arm is in said off position.

DRAWINGS

These and other objects and features shall now be described in relation to the following drawings.

FIG. 7 is a cross-sectional view taken along the lines 7—7 of FIG. 2.

DESCRIPTION OF THE INVENTION

Similar items have been given the same numbers throughout the figures.

Figure 2:
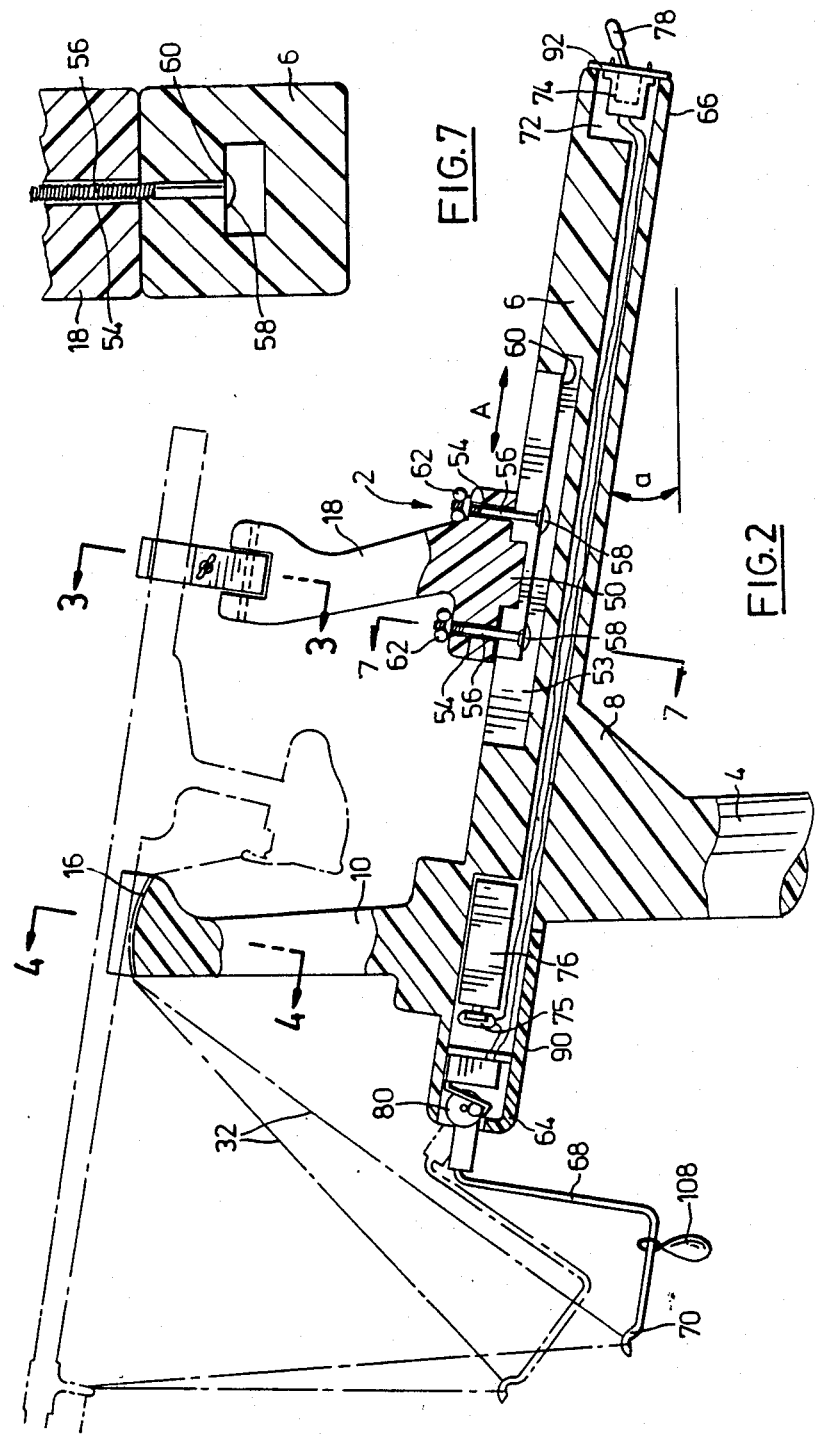
FIG. 2 is a side elevational view taken along the lines 2—2 of FIG. 1.
Figure 3:
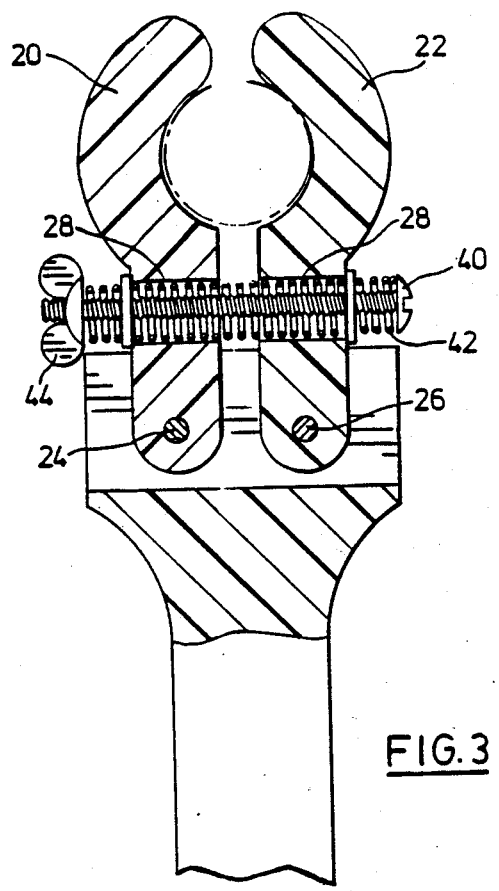
FIG. 3 is a side elevational view of the clamping stand taken along the lines 3—3 of FIG. 1.

The fishing rod holder 2 includes a vertical stand 4 integrally connected to an elongated body 6 which is disposed at an acute angle a from the horizontal as best illustrated in FIG. 2 so as to present an inclined end 64 and a declined end 66. The fishing rod holder 2 also includes a reinforcing gusset 8 for reinforcing the strength of fishing rod holder 2.

Figure 4:
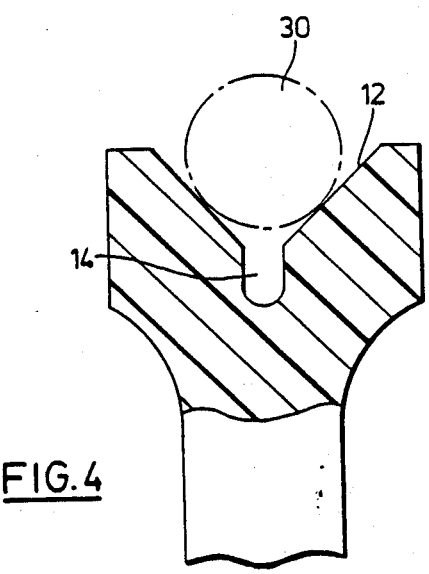
FIG. 4 is a side elevational view of the stand taken along the lines 4—4 of FIG. 1.

A post 10 projects vertically upwardly from the an elongated body 6 and terminates with a V-shaped notch 12 as illustrated in FIG. 4 which is adapted to hold the pole or rod of the fishing rod 30. The bottom of notch 12 includes a channel 14 which has a curved bottom surface 16 adapted to slidingly receive the line 32 of fishing rod 30.

A clamping post 18 also extends vertically upwardly from the body 6. The clamping post 18 presents two clamping arms 20 and 22 which are adapted for pivotable movement about pintles 24 and 26 which pivotally connect clamping arms 20 and 22 respectively to clamping post 18. Clamping arms 20 and 22 each include holes 28 adapted to receive a bolt 40, spring 42, and wing nut 44.

The clamping arms 20 and 22 are adapted to clamp the handle of the fishing rod 30 by means of loosening wing nut 44 then spreading the arms 20 and 22 apart so as to insert the handle of fishing rod 30 therebetween and then tightening wing nut 44 so as to embrace or clamp the handle of fishing rod 30 between arms 20 and 22.

The clamping post 18 is also slidingly positionable along body 6 so as to be capable of adjustment to accommodate different sizes of fishing rods. In other words, the fishing rod holder 2 as described herein is adapted to retain the reel portion of a fishing rod 30 between post 16 and clamping post 18, and then clamping post 18 is slidingly adjustable along body 6 in the direction of Arrow A so as to accommodate different sizes of fishing rods 30.

More particularly the bottom portion of clamp post 18 includes a tongue 50 which rides within slot 52. Furthermore, the bottom portion of clamping post 18 includes two holes 54 adapted to receive bolts 56 which have heads 58, whereby the bolts 56 are adapted to ride within slots 52 while the heads 58 bear against an internal shoulder 60 presented by the internal cross-section of the slot 52 as best illustrated in FIG. 2. The bolts 56 are also provided with wing nuts 62 for tightening the clamping post 18 in its selective position. The bolts 56 may be pulled out through the enlarged opening 53 of slot 52.

An arm 68 is pivotally connected at the inclined end 64 of body 6 and is engageable with line 32 by means of the hook portion 70 for pivotal movement between an off position illustrated in FIG. 2 and an on position illustrated by the phantom lines of FIG. 2 which shall be more fully described herein.

The declined end 66 of body 6 includes a signal means 72 such a buzzer 74 and/or a light signal 75 which are actuated in a manner to be described herein so as to alert the fisherman of a fish having pulled on the line 32 of the fishing rod 30. The declined end 66 includes an auxilay switch 78 to turn the signal means 72 off.

The inclined end 64 also includes a power pack 76 such as a 9-volt D.C. battery which is electrically connected to the switch BO and buzzer 74 and light switch 75.

Figure 1:
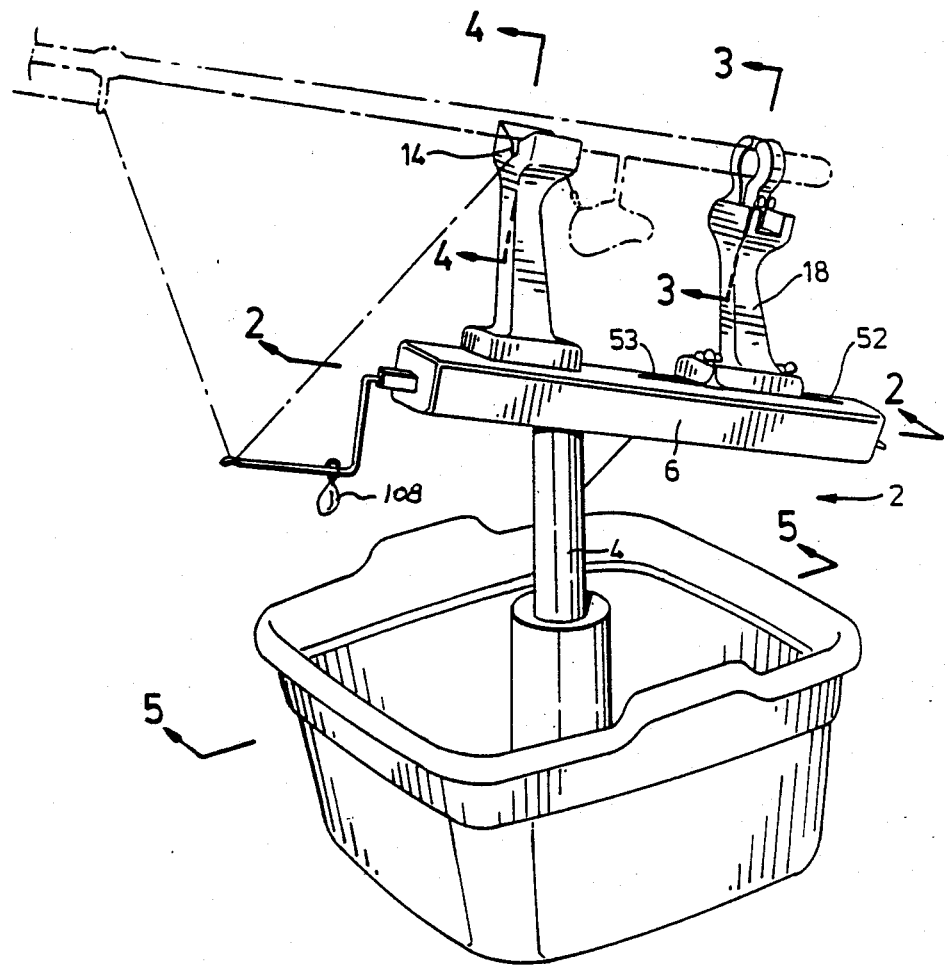
FIG. 1 is a perspective view of said fishing rod holder.

A switch means or device 80 is disposed internally of the body 6 at the inclined end 64 and is connected to the arm 68 and is electrically connected to the signal means 72 so as to actuate the signal 74 and 75 when the arm is raised to the on position as illustrated by the phantom lines of FIG. 1. So long as the arm is in the off position the signals 74 and 75 will not be actuated. The inclined end 64 includes a plate 90 which can be removed to permit access to the switching mechanism 80 for repair or for assembly and also to access the battery 76. Plate 90 is releasably fastened to the inclined end 64 by any number of means well known to those persons skilled in the art as for example through the use of screws or the like.

The declined end 66 also includes a cover plate 92 which may be removed to permit access to the signal device 72.

Figure 5:
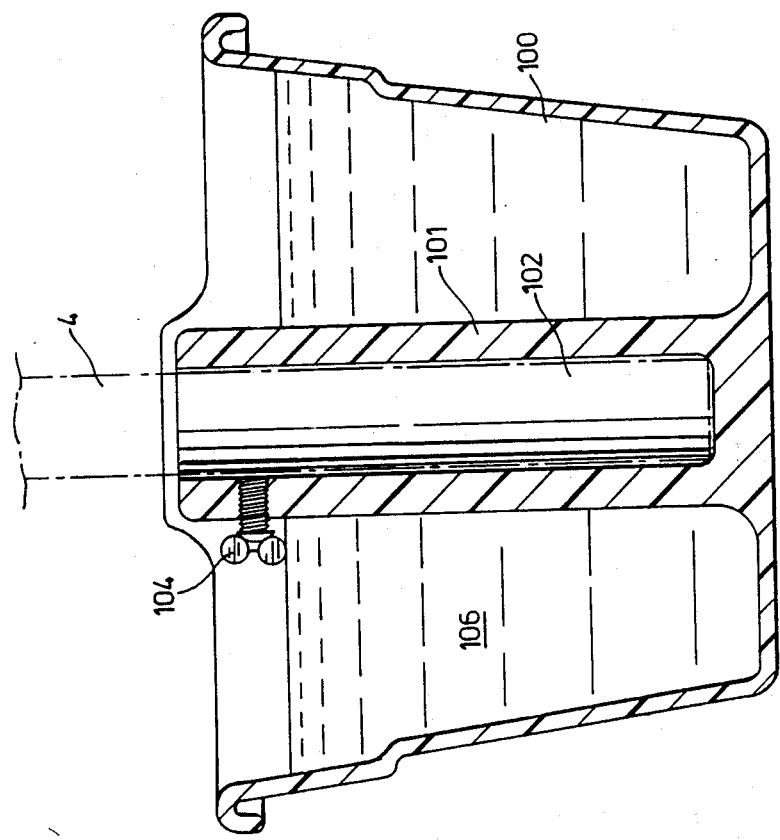
FIG. 5 is a side elevational view of the container taken along the lines 5—5 of FIG. 1.

The fishing rod holder 2 described herein may be anchored to the ground by either presenting a hollow bore 94 at one end of the vertical stand 4 which is adapted to receive the protruding end 96 of a spike 98 driven into the ground; or alternatively the stand can be utilized in association with the container 100 which presents an upwardly extending cylindrical housing 101 having a bore 102 adapted to receive one end of the stand 4 as illustrated in FIG. 5. A clamping screw 104 is presented in the housing 101 to anchor the stand 4 into place.

The container 100 can then be filled with water 106, sand or the like in order to solidly place the fishing rod holder 2 into place.

Figure 6:
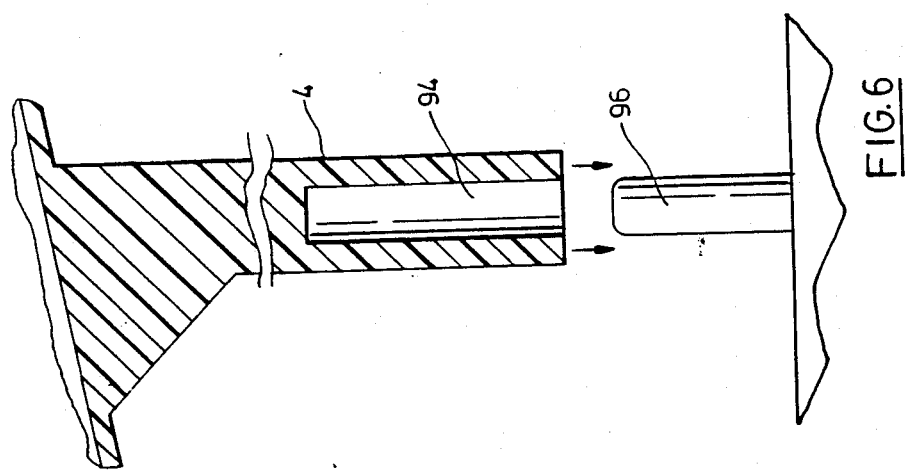
FIG. 6 is an alternate side elevational view of the stand adapted to be received by the protruding end of a spike driven into the ground.

The operation of the fishing rod holder 2 shall now be described. The user of the fishing rod holder 2 will anchor the stand 4 either by utilizing a spike 98 as shown in FIG. 6 or by utilizing the container 100 as illustrated in FIGS. 1 and 2. The fishing rod 3 would next be placed so that the post 10 holds the pole of the fishing rod 30 as described herein and receives line 32 into notch 14. Clamping post 18 is then adapted to clamp the handle of the fishing rod 30 and the clamping post 18 is adjustably clamped to body by tightening wing nuts 62 as described earlier. Line 32 is then pulled downwardly by the fisherman so as to catch arm 68 at hook 70.

If the tension of line 32 is too great so a to falsely set off signal 74 or 75 the fisherman may add selectable weights 108 to increase the resistance of arm 70 to pivotable movement between the off and on position in response to a pull or tension on the line 32 of the fishing rod.

Furthermore, such weights could be added in the event of water having large waves which would tend to pull on the line 32 and provide a false alarm.

Once the fish (not shown) bites on the bait (not shown) and pulls line 32 the arm 68 is pulled upwardly to the on position and the switch 80 activates the signal alarm 74 and 75 to alert the fisherman that a fish is on the line.

Although the preferred embodiment as well as the operation and use have been specifically described in relation to the drawings, it should be understood that variations in the preferred embodiments could easily be achieved by a man skilled in the art without departing from the spirit of the invention. Accordingly the invention should not be understood to be limited to the exact form revealed in the drawings.

The embodiments of the invention in which an exclusive property or privilege is claimed are defined as follows:

1. A fishing rod holder adapted to generate a signal in response to a pull on the line of a fishing rod, including:
   (a) a means for supporting said fishing rod;
   (b) arm means which is substantially Z-shaped, one end of the arm is attached to a pivot located at one end of said support means, and the other arm end is hookably engageable with said line of said fishing rod, whereby an upward pull from the line will initiate a pivotable displacement from an "off" position to an "on" position;

(c) signal means for generating a signal when said arm means is in said on position; and (d) switch means associated with said arm means and said signal means for activating said signal means to generate a signal when said arm is in said on position in response to a pull on said line of said fishing rod, and for deactivating same signal means when said arm is in said off position.

2. A fishing rod holder as claimed in claim 1 wherein said support means includes:
   (a) a vertical stand;
   (b) an elongated body integrally connected to said stand;
   (c) holding means for holding said rod, said holding means including a channel adapted to slidingly receive said line;
   (d) clamping means slideably positionable along said body for clamping the handle of said fishing rod.

3. A fishing rod holder as claimed in claim 2 wherein said body is inclined at an acute angle from the horizontal, and wherein said holding means and said clamping means support said fishing rod at said acute angle from the horizontal.

4. A fishing rod holder as claimed in claim 3 wherein said switch means is disposed interiorally of said body in the region adjacent said arm means, and said signal means is disposed interiorally of, and at other end of said body, and wherein said switch means is electrically connected to said signal means.

5. A fishing rod holder as claimed in claim 4 wherein said signal means comprises a buzzer and a light signal.

6. A fishing rod holder as claimed in claim 5 wherein said vertical stand includes a hollow bore at one end thereof for receiving the protruding end of a spike driven into the ground.

7. A fishing rod holder as claimed in claim 5 including a container adapted to be filled with water or sand, and said container including means for receiving and releasably anchoring said stand.

8. A fishing rod holder adapted to generate a signal in response to a pull on the line of a fishing rod including:
   (a) a vertical stand;
   (b) an elongated body integrally connected to said stand and inclined at an acute angle from the horizontal so as to present one inclined end of said body and one declined end of said body;
   (c) a post projecting vertically upwardly from said body and terminating with a V-shaped notch adapted to hold said rod, said post including a channel for slideably receiving said line;
   (d) clamping post extending vertically upwardly from said body for clamping the handle of said fishing rod, said clamping post slideably positionable along said body for adjustment relative said vertical post;
   (e) arm means which is substantially z-shaped, one end of the arm is attached to a pivot located at said inclined end of said body, and the other arm end is hookably engageable with said line of said fishing rod, whereby an upward pull from the line will initiate a pivotable displacement from an "off" to an "on" position.
   (f) signal means disposed interiorally of said body at said declined end for generating a signal when said arm is in said on position;
   (g) switch means disposed interiorally of said body at said inclined end and connected to said arm and said signal means for activating said signal means to generate a signal when said arm is in said on position in response to a pull on said line of said fishing rod, and for deactivating said signal when said arm is in said off position.

9. A fishing rod holder adapted to generate a signal in response to a pull on the line of a fishing rod, including:
   (a) a means for supporting said fishing rod;
   (b) arm means one end of the arm is attached to a pivot located at one end of said support means, and the other end is hookably engageable with said line of said fishing rod, whereby an upward pull from the line will initiate a pivotable displacement from an off position to an on position; including selectable weight means carried by said arm means for selectably increasing the resistance to the pivotable movement of said arm means between said off position and said on position in response to a pull on said line of said fishing rod;
   (c) signal means for generating a signal when said arm means is in said on position;
   (d) switch means associated with said arm means and signal means for activating said signal means to generate a signal when said arm is in said on position in response to a pull on said line of said fishing rod and for deactivating said signal means when said arm means is in said off position.

* * * * *